(12) United States Patent
Yamamoto et al.

(10) Patent No.: US 7,464,452 B2
(45) Date of Patent: Dec. 16, 2008

(54) METHOD OF CONNECTING TWO MEMBERS USING A PIN

(75) Inventors: Shusuke Yamamoto, Shizuoka-ken (JP); Toshiyuki Iwai, Chiba-ken (JP); Hirofumi Noro, Wako (JP); Tomoo Oka, Tokyo (JP); Shinichi Kuwahara, Tokyo (JP)

(73) Assignees: Kabushiki Kaisha Yutaka Giken, Hamamatsu-Shi (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/293,186

(22) Filed: Dec. 5, 2005

(65) Prior Publication Data

US 2006/0080821 A1 Apr. 20, 2006

Related U.S. Application Data

(62) Division of application No. 09/688,837, filed on Oct. 17, 2000, now abandoned.

(30) Foreign Application Priority Data

Oct. 18, 1999 (JP) .............................. 1999-294656

(51) Int. Cl.
*B23P 11/00* (2006.01)
(52) U.S. Cl. .............................. 29/505; 29/509; 29/521; 29/525.01; 29/525.05; 403/278
(58) Field of Classification Search .................. 29/505, 29/506, 509, 512, 521, 525, 525.01, 525.02, 29/525.05, 283.5, 522.1; 403/274, 278, 279, 403/280, 282; 72/199, 365.2, 252.5; 188/218 XL; 411/176
See application file for complete search history.

(56) References Cited

U.S. PATENT DOCUMENTS

| 1,291,646 | A | * | 1/1919 | Hughes | 285/222 |
| 1,672,567 | A | * | 6/1928 | Hawley | 72/373 |
| 2,612,073 | A | | 9/1952 | Taylor | 411/501 |
| 2,767,877 | A | | 10/1956 | Newsom | 403/167 |
| 2,830,485 | A | * | 4/1958 | Macy | 411/80.1 |

(Continued)

FOREIGN PATENT DOCUMENTS

FR 1536885 9/1967

(Continued)

OTHER PUBLICATIONS

European Office Action dated Jan. 21, 2004.

*Primary Examiner*—Jermie E Cozart
(74) *Attorney, Agent, or Firm*—Kratz, Quintos, Hanson, LLP.

(57) ABSTRACT

A pin connection structure is used in a floating type brake disc assembly. The assembly is made up of a hub, and an annular disc which is concentrically disposed around the hub with a clearance therebetween. The hub and the disc have plural sets of semicircular connecting dents opening toward the clearance to thereby form respective inserting holes. A hollow pin is inserted into each of the inserting holes with a washer fitted on that one end of the hollow pin which is subsequently caulked radially outward for fixing the washer in position. The hollow pin is made of a metal having a surface-treated layer, and the caulked end of the hollow pin is formed into a convex shape in at least part of the end portion.

10 Claims, 4 Drawing Sheets

U.S. PATENT DOCUMENTS

| | | | |
|---|---|---|---|
| 3,094,881 A | 6/1963 | Schultz, Jr. | 29/512 |
| 3,969,889 A * | 7/1976 | Araya | 59/8 |
| 4,221,041 A | 9/1980 | Hufnagl et al. | 29/512 |
| 4,642,011 A | 2/1987 | Uramoto et al. | 411/258 |
| 4,645,041 A | 2/1987 | Bass | 188/218 XL |
| 4,817,264 A | 4/1989 | Worthing | 29/512 |
| 5,131,145 A * | 7/1992 | Badoureaux | 29/890.144 |
| 5,251,370 A | 10/1993 | Muller et al. | 29/512 |
| 5,299,667 A | 4/1994 | Hammond | 188/218 |
| 5,301,414 A * | 4/1994 | Gautheron | 29/451 |
| 5,330,036 A | 7/1994 | Nishi et al. | 188/251 M |
| 5,520,269 A | 5/1996 | Yamamoto et al. | 188/218 XL |
| 5,551,816 A | 9/1996 | Brewer et al. | 411/43 |
| 5,651,172 A | 7/1997 | Auriol et al. | 29/512 |
| 5,806,166 A * | 9/1998 | Fuser | 29/523 |
| 5,836,429 A | 11/1998 | McGuire et al. | 188/340 |

FOREIGN PATENT DOCUMENTS

| | | |
|---|---|---|
| JP | 8-312700 | 11/1996 |
| JP | 9-14230 | 1/1997 |

\* cited by examiner

METHOD OF CONNECTING TWO MEMBERS USING A PIN (This application is a divisional application of Ser. No. 09/688,837 filed Oct. 17, 2000 now abandoned)

BACKGROUND OF THE INVENTION

1. Field of the Invention

The present invention relates, in general, to a pin connection structure and to a method of connecting members by a pin. Specifically, it also relates to a pin connection structure for use in a floating type brake disc assembly and to a method of connecting the floating type brake disc assembly by pins, the brake disc assembly being for use in a motorcycle.

2. Description of Related Art

As an art of connecting at least two members by a pin, there has been generally practiced to employ a pin connection structure with a hollow pin in order to reduce the weight of the pin. Further, there has also been generally practiced to provide the pin with a surface-treated layer in order to improve the durability of the pin. Specifically, the above-described pin connection structure is also employed in connecting a floating type brake disc assembly by pins.

The applicants of the present invention have been studying how to improve the corrosion resistivity of hollow pins made of various metallic materials such as aluminum alloys, ferrous materials, or the like, by providing them with surface treatment. When an aluminum alloy is used as a material for the hollow pins which are used in a floating type brake disc assembly, the heat generated in the disc due to the friction can be easily transferred to the hub side and, consequently, the heat easily dissipates also from the pins themselves. As a result, the disc can be prevented from being distorted by the friction heat, and also the pins can be made smaller in weight.

However, if an aluminum alloy having applied to the surface thereof a corrosion resistant surface-treated layer such as an oxide coating film (anodic oxidation coating), a chromate film, a metallic coating, a dying coating, a colored coating, or the like, is used under the below-described condition, for making a hollow pin as described below, the surface-treated layer on an end portion of the hollow pin is damaged at the time of caulking, whereby the base surface of the end portion of the pin is exposed to the outside, resulting in a poor-corrosion resistivity and a poor aesthetic appearance. The above-described condition in question is that the shape of a center hole of the hollow pin is formed into the same shape as that of a pin which is designed on condition that it is made in a stainless steel or in a coiled steel material. Such a pin with such a shape is disclosed, for example, in Published Unexamined Japanese Patent Application No. 312700/1996. In more detail, the shape in question is one in which the center hole in the hollow pin is made cylindrical up to the end portion on that side of the pin which is to be caulked, or one in which the end portion of the center hole is chamfered into a linearly tapered shape (i.e., into a shape tapered or beveled in a straight line).

FIGS. 7A and 7B show a construction of a conventional hollow pin as applied to floating type brake disc assembly for use in a motorcycle. The hollow pin is made of an aluminum alloy and which has applied thereto an oxide coating film and in which an end portion of the center hole is provided with a small taper (i.e., a bevel in a straight line). The hollow pin shown in FIG. 7A has a taper a2 in an inner circumferential end portion of the center hole al. This hollow pin "a" is inserted into a connecting hole made of semicircular dents bl, cl formed in a hub b and a disc c, respectively. A washer dl, a coned spring disc e, and a fixing washer d2 are fitted onto an outside of the hollow pin "a" and an end portion of the hollow pin "a" is caulked to thereby radially expand the end portion. The fixing washer d2 is thus fixed in position by caulking. When the end portion is caulked, however, the shape of the end portion changes from the one shown in FIG. 7C to the one shown in FIG. 7D.

At this time, it has been found that a ring-shaped crack f occurs to the oxide film on the end surface, whereby the base surface of the aluminum alloy will be exposed to the outside, resulting in a poor corrosion resistivity and in a poor aesthetic appearance. If the end surface is not tapered, the cracking of the oxide film becomes still larger.

In view of the above points, the present invention has an object of providing a pin connection structure, in general, and a method of connecting, in general, at least two members by a pin.

SUMMARY OF THE INVENTION

In order to attain the above and other objects, the present invention is a pin connection structure comprising: at least two members to be connected together, each of the members having an inserting hole; a hollow pin which is inserted into the inserting hole and is caulked radially outward at an end portion thereof to thereby connect the members together, wherein the hollow pin is made of a metal having a surface-treated layer, and wherein the hollow pin is formed into a convex shape in at least part of the end portion.

According to this arrangement, the hollow pin is formed into a convex shape in at least part of the end portion such that the end portion of the hollow pin is free from a sharply bent edge on which the caulking pressure is concentrated. Therefore, the caulking pressure is dispersed or distributed on the caulked surface to thereby prevent the damages to the surface-treated layer.

Preferably, the metal is an aluminum alloy or a ferrous material, and the surface-treated layer is an oxide corrosion-resistant film formed on the aluminum alloy, or chromium plating or nickel plating formed on the ferrous material.

According to another aspect of the present invention, there is provided a pin connection structure for use in a floating type brake disc assembly comprising: a hub; an annular disc which is concentrically disposed around the hub with a clearance therebetween, the hub and the disc having plural sets of semi-circular connecting dents opening toward the clearance to thereby form respective inserting holes; and a hollow pin inserted into each of the inserting holes with a washer fitted on that one end portion of the hollow pin which is subsequently caulked radially outward for fixing the washer in position. The hollow pin is made of a metal having a surface-treated layer, and the hollow pin is formed into a convex shape in at least part of the end portion.

According to this arrangement, a similar effect of dispersing the caulking pressure on the caulked surface as described above can be attained.

According to still another aspect of the present invention, there is provided a method of connecting at least two members by a pin, comprising the steps of: disposing the members one on top of the other, each of the members having an inserting hole; inserting a hollow pin into the inserting hole of each of the members; caulking an end portion of the hollow pin radially outward to thereby fix the members together. The hollow pin is made of a metal having a surface-treated layer and is formed into a convex shape in at least part of the end portion. The caulking is made by rolling a roller over the end portion of the hollow pin.

According to this arrangement, the hollow pin is formed into a convex shape in at least part of the end portion to be caulked such that the end portion of the hollow pin is free from a sharply bent edge on which the caulking pressure is concentrated. Therefore, the caulking pressure is dispersed or distributed on the caulked surface to thereby prevent the damages to the surface-treated layer. In addition, since the caulking is made by rolling a roller, the caulked surface is formed gradually and, as a consequence, there will occur no damages to the surface-treated layer.

In still another aspect of the present invention, there is provided a method of connecting a floating type brake disc assembly by pins, comprising the steps of: disposing a hub and an annular disc in a concentric relationship with each other with a clearance therebetween, each of the hub and the annular disc having plural sets of semicircular connecting dents opening toward the clearance to thereby form inserting holes; inserting a hollow pin into each of the inserting holes; fitting a washer onto one end portion of each of the hollow pins; and caulking said one end portion of each of the hollow pins radially outward to thereby fix the washer in position. Each of the hollow pins is made of a metal having a surface-treated layer and is formed into a convex shape in at least part of said one end portion, and the caulking is made by rolling a roller over said one end portion of each of the hollow pins.

According to this arrangement, a similar effect as described above can be attained.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 7A-7D show conventional examples, in which FIG. 7A is a sectional view of a conventional pin, FIG. 7B is a sectional view of a conventional pin connection structure as applied to a brake disc assembly, FIG. 7C is a partial perspective view of an end portion of a conventional hollow pin with a taper (i.e., in a straight line), and FIG. 7D is a conventional hollow pin with a crack in a surface-treated layer after caulking.

DETAILED DESCRIPTION OF PREFERRED EMBODIMENTS

Figure 1:
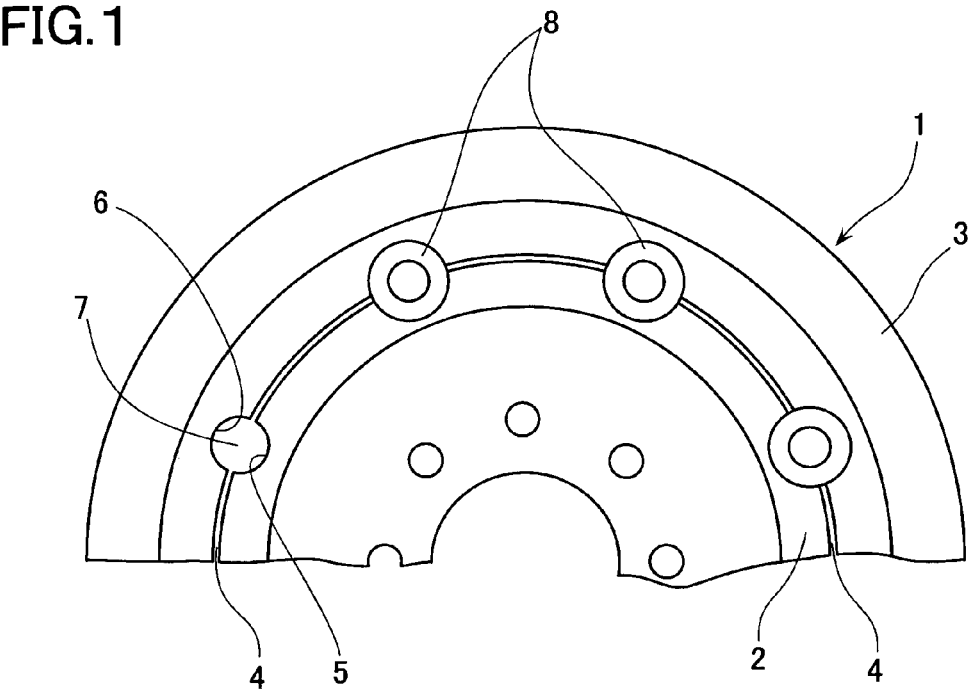
FIG. 1 is a partial front view of a pin connection structure as applied to a floating type brake disc assembly according to the present invention.

Preferred embodiments of the present invention will now be described with reference to the enclosed drawings. FIG. 1 is a front view of a floating type brake disc assembly with part thereof being omitted. The brake disc assembly is intended to be an example in which the pin connection structure of the present invention is applied.

Figure 2A:
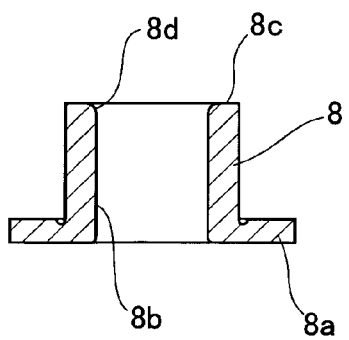
FIGS. 2A and 2B are sectional views of a hollow pin and a brake disc assembly, respectively.

Reference numeral 1 denotes a floating type brake disc assembly, reference numeral 2 denotes a hub which is coupled to a shaft of a vehicle, i.e., a motorcycle in this embodiment, reference numeral 3 denotes an annular disc for applying thereto a braking force. The hub 2 and the disc 3 are disposed concentrically to each other with a small clearance 4 therebetween. A pair of semicircular connecting dents or recesses 5, 6 are provided in the hub 2 and the disc 3, respectively, in predetermined sets at a predetermined circumferential distance from each set. Circular discontinuous inserting holes 7 for inserting hollow pins 8 therethrough are thus formed by the respective pair of connecting dents 5, 6. Each of the hollow pins 8 to be inserted into each of the inserting holes 7 is made up, as shown in FIG. 2A, of a flange 8a on one axial end the hollow pin 8, and a center hole 8b which extends along an axial line of the hollow pin 8. In the corner portion between the inner circumference of the center hole 8b and that end surface 8c of the hollow pin 8 which is at a right angle to the axial line, there is formed a rounded or curved portion 8d which has a convex shape in at least part of the corner portion as explained in more detail hereinbelow with reference to FIGS. 4A through 4D. As a material for the hollow pin 8, the following may be used, i.e., an aluminum alloy under JIS (Japanese Industrial Standards) No. 6061T6, which specifies a chief ingredient, in mass %, of Mg: 0.8-1.2%, Si: 0.40-0.8%, Cu: 0.15-0.40%; Cr: 0.04-0.35%; the rest being Al. The hollow pin 8 has applied to the surface thereof an oxide corrosion-resistant film or coating.

Figure 2B:
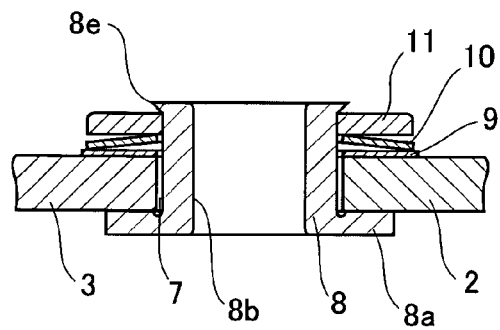
Figure 2C:
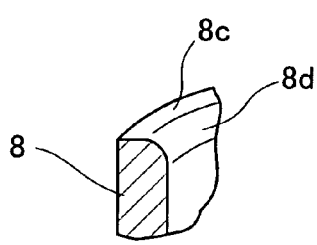
FIGS. 2C and 2D are partial perspective views of that portion of the hollow pin which is before and after caulking, respectively, according to the present invention.

As shown in FIG. 2B, the hollow pin 8 is inserted into the inserting hole 7. A washer 9, a washer 10 and a fixing washer 11 are then inserted onto an outer surface of the hollow pin 8 in the order mentioned. That end of the hollow pin 8 which is on the opposite side of the flange 8a, more particularly, the range from the portion formed into a convex 8d to the end surface 8c, is caulked by means of a caulking means to be described hereinafter.

Figure 2D:
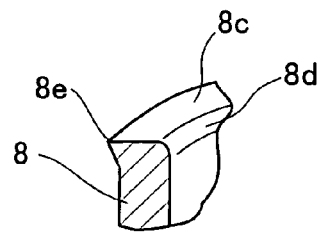

As a result of the caulking, a radially enlarged portion 8e as shown in FIG. 2D is formed to thereby fix the fixing washer 11 in position. By caulking the end of the hollow pin 8 in this manner, the surface-treated layer is not damaged. This is because the hollow pin 8 is formed into a convex shape in at least part of the end portion to be caulked such that the end portion is free from a sharply bent edge on which the caulking pressure is concentrated. Therefore, the caulking pressure is dispersed or distributed on the caulked surface to thereby prevent the damages to the surface-treated layer.

An explanation has so far been made about an example in which a hollow pin is used, the hollow pin being made of an aluminum alloy with a corrosion-resistant layer thereon. The material for the hollow pin is not limited to an aluminum alloy but may alternatively be a soft ferrous metal which is capable of being caulked. As a surface-treated layer for the ferrous metal, chromium plating, nickel plating, or the like may be used.

Figure 3A:
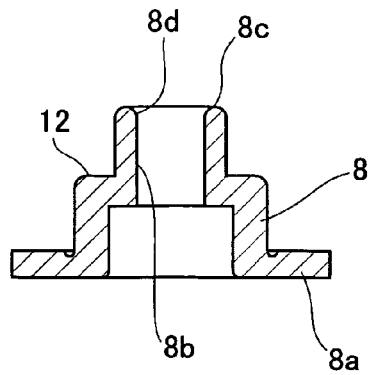
FIGS. 3A and 3B are sectional views of a modified example of the present invention.
Figure 3B:
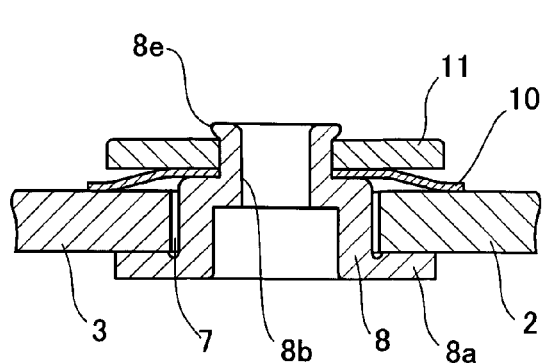

FIGS. 3A and 3B show a modified example using a hollow pin 8 with a stepped portion 12. The hollow pin 8 is made up of a small-diameter portion and a large-diameter portion which lies on the side of a flange 8a. The stepped portion 12 is formed in a portion where the small-diameter portion changes to the large-diameter portion. The large-diameter portion of the hollow pin 8 is inserted into the inserting hole 7. On top of the stepped portion 12, a coned spring washer 10 is inserted into the small-diameter portion so as to be seated on the stepped portion. A fixing washer 11 is placed on top of the coned spring washer 10, and the end of the hollow pin 8 is then caulked onto the fixing washer 11 in the same way as in the above-described example. The fixing washer 11 can thus be fixed in position without damaging the surface-treated layer.

Figure 4A:
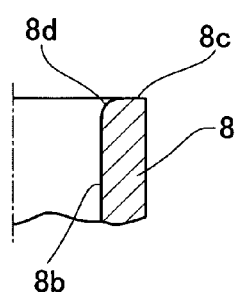
FIGS. 4A through 4G are cross sectional views of that end portion of the hollow pin which is caulked.
Figure 4B:
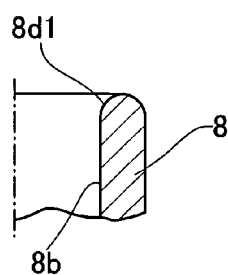
Figure 4C:
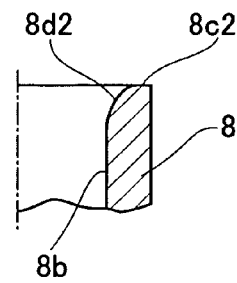
Figure 4D:
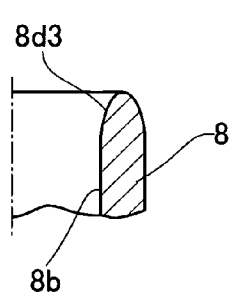
Figure 4E:
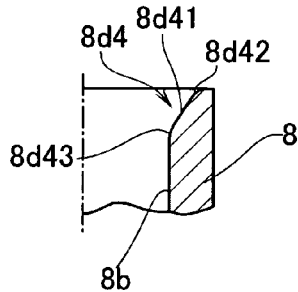
Figure 4F:
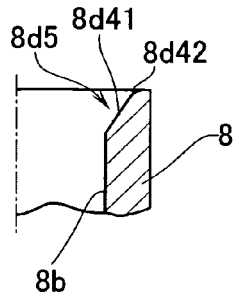
Figure 4G:
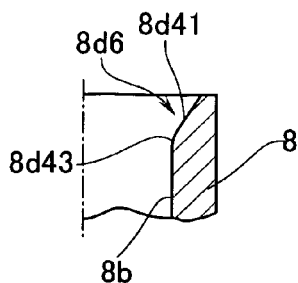

FIGS. 4A through 4G show various examples of the shape of that end portion of the hollow pin 8 which is caulked. In the example in FIG. 4A, that one end of the hollow pin 8 which is subsequently caulked radially outward (also called a caulked end) is the same as that shown in FIG. 2. Namely, at the corner of a front inner periphery of the center hole 8b, the front end portion 8d which is in the concave shape is formed. A modified example in FIG. 4B is the same as that shown in FIG. 3A. Namely, a semicircular curved portion 8d1 is formed both in the inner periphery and in the outer periphery of the caulked end. In a modified example shown in FIG. 4C, a front end portion in an elliptic shape is formed on the inner periphery of the center hole 8b to such a degree that the flat end surface 8c2 remains partially in the radially outer portion. In a modified example shown in FIG. 4D, curved portion 8d3 in a parabolic shape is formed both in the inner periphery and in the outer periphery of the caulked end. In the above-described examples, the hollow pin 8 is formed such that the caulked end has a curved portion 8d, 8d1, 8d2, 8d3 which is formed into a convex shape in the portion to which a pressurizing force is applied at the time of caulking.

As still other modified examples, the following arrangement may be employed. Namely, the curved portion is made up of one tapered or beveled surface (i.e., having a straight line) combined with one or two convex surfaces. In the example shown in FIG. 4E, the front end portion 8d4 is made up of a tapered portion 8d41 and convex surfaces 8d42, 8d43 which are formed on both axial sides of the tapered portion 8d41. In the example shown in FIG. 4F, the front end portion 8d5 is made up of a tapered portion 8d4l and a convex surface 8d42 which is formed only on an axially outer side of the tapered portion 8d41. In the example shown in FIG. 4G, the front end portion 8d6 is made up of a tapered portion 8d41 and a convex surface 8d43 which is formed only on an axially inner side of the tapered portion 8d41. In any one of the above-described examples, the hollow pin 8 is formed into a convex shape in at least part of the end portion to be caulked such that the caulked end is free from a sharply bent edge on which the caulking pressure is concentrated. It is thus so arranged that the caulking pressure is dispersed or distributed on the caulked surface to thereby prevent the damages to the surface-treated layer.

Figure 5:
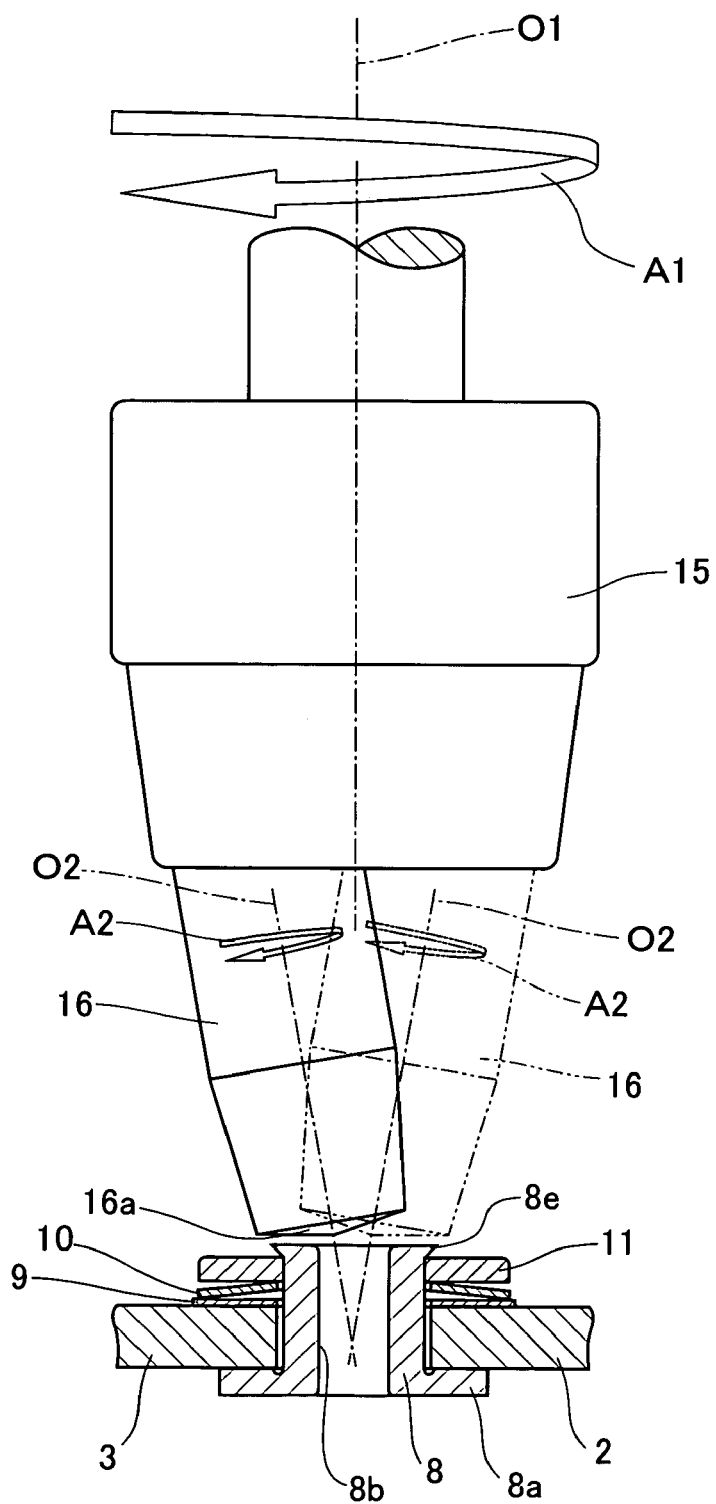
FIG. 5 is a side view of a caulking apparatus to be used in caulking the end portion of the hollow pin.

FIG. 5 shows an outline of a caulking apparatus which is used to caulk the hollow pin 8 of the present invention. The caulking apparatus is made up of a head 15 which is rotatable about a vertical axial line O1, and an insert 16 which is rotatable about an inclined central axial line O2 and which is rotatably supported on the head 15. At a front end of the insert 16, there is provided a pressurizing surface 16a which is formed at an obtuse angle. When the head 15 is driven in the direction of an arrow "A1" while the pressurizing surface 16a, held in substantially horizontal posture, is pressurized against the pressurizing surface 16a, the insert 16 will be rotated on its own axis in the direction of an arrow "A2" while revolving round the center line O1 in the direction of the arrow "A1." According to this operation, the area which extends from the axial end portion of the hollow pin 8 to the portion formed into convex is caulked as a result of pressurizing and rolling movements. As a result, there is formed a diametrically enlarged portion 8e on the end portion of the hollow pin 8, whereby the fixing washer 11 is fixed in position.

The above-described embodiments have a construction in which the flange 8a is disposed on a side opposite to the caulked end. However, the present invention can also be applied to an example in which a washer is fixed instead of the flange 8a.

Further, an explanation has so far been made about an embodiment in which the present invention is applied to a specific example in the form of a pin connection structure of a floating type brake disc assembly. However, the present invention is generically applicable to a pin connection structure for connecting at least two members together by using a pin. Such an example is described hereinbelow.

Figure 6:
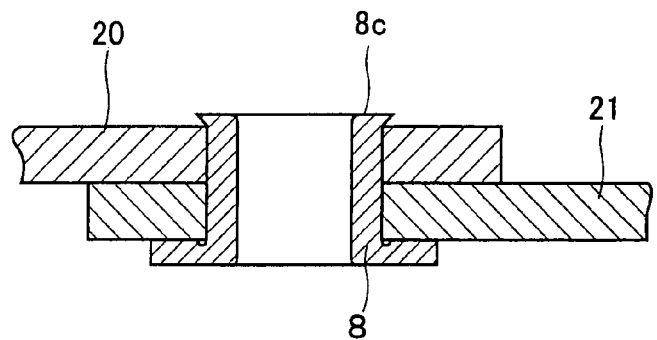
FIG. 6 is a sectional view of a pin connection structure, in general, for connecting at least two members together according to the present invention.
Figure 7A:
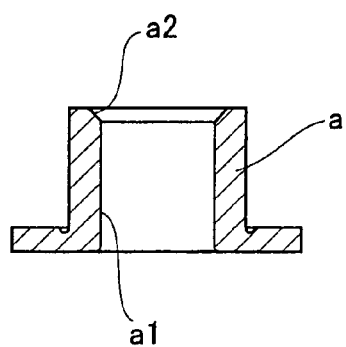
Figure 7B:
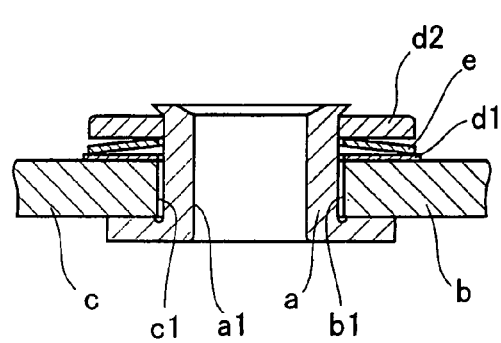
Figure 7C:
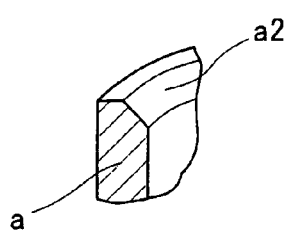
Figure 7D:
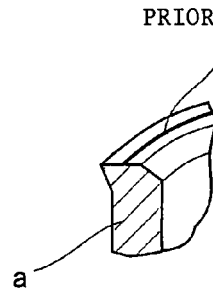

FIG. 6 shows a pin connection structure in which at least two members in general are connected together by a pin. In concrete, a plate members 20 and 21 are fixed together by means of a hollow pin 8. As a material for manufacturing the pin 8, an aluminum alloy, a ferrous material or the like is used. The hollow pin 8 has the same structure as in the above-described example and, therefore, detailed explanation about the hollow pin 8 itself is not repeated here. When the hollow pin 8 is caulked radially outward to thereby fix the two members together, the surface-treated layer on the end surface 8c has not been damaged.

As can be seen from the above-described explanations, according to one aspect of the present invention, since the hollow pin has a convex shape in at least part of the end portion to be caulked, the caulking pressure will not be concentrated. Accordingly, the surface-treated layer on the caulked end of the hollow pin will not be damaged. Therefore, a hollow pin which is superior in corrosion resistivity and in aesthetic appearance can be obtained. By employing an aluminum alloy as the material for the hollow pin, the hollow pin becomes superior in heat transfer, and thus can prevent the thermal distortion of the connected material, i.e. a brake disc assembly in the specific example.

According to still another aspect of the present invention, since the caulked surface is formed into a concave shape in at least part of the end portion, there will occur no concentration of the caulking pressure. In addition, since the caulking is gradually performed by means of rolling with a roller, there will occur no damage to the surface-treated layer on the end surface of the hollow pin. Therefore, at least two members, as exemplified by a brake disc assembly, with the structure of pin connection can be easily obtained.

According to still another aspect of the present invention, by using an aluminum alloy or a ferrous material for manufacturing the hollow pin, the hollow pin can be easily caulked with a smaller resistance.

It is readily apparent that the above-described pin connection structure, the pin connection structure for use in floating type brake disc assembly, the method of connecting at least two members by a pin, and the method of connecting a floating type brake disc assembly by pins meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of connecting at least two members by a pin, comprising the steps of:
   disposing the members one on top of the other, each of the members having an inserting hole;
   inserting a hollow pin into the inserting hole of each of the members; and caulking an end portion of said hollow pin radially outward to thereby fix said members together, wherein said hollow pin is made of a metal having a surface-treated layer and is formed into a convex shape in at least part of said end portion, and wherein said caulking is made by rolling a roller over said end portion of said hollow pin so that rolling pressure applied during said caulking step is dispersed or distributed so that any damage to the surface-treated layer is prevented, wherein a parabolic shape is formed in both in an inner periphery and in an outer periphery of said end portion of said hollow pin.

2. The method according to claim 1, wherein said metal is an aluminum alloy.

3. The method according to claim 2, wherein said surface-treated layer is an oxide corrosion-resistant film.

4. The method according to claim 1, wherein said metal is a ferrous material.

5. The method according to claim 4, wherein said surface-treated layer is one of chromium plating and nickel plating.

6. A method of connecting a floating type brake disc assembly by pins, comprising the steps of: disposing a hub and an annular disc in a concentric relationship with each other with a clearance therebetween, each of said hub and said annular disc having plural sets of semicircular connecting dents opening toward said clearance to thereby form inserting holes;

inserting a hollow pin into each of said inserting holes;

fitting a washer onto one end portion of each of said hollow pins; and caulking said one end portion of each of said hollow pins radially outward to thereby fix said washer in position, wherein each of said hollow pins is made of a metal having a surface-treated layer and is formed into a convex shape in at least part of said end portion, and wherein said caulking is made by rolling a roller over said one end portion of each of said hollow pins so that rolling pressure applied during said caulking step is dispersed or distributed so that any damage to the surface-treated layer is prevented, wherein a parabolic shape is formed in both in an inner periphery and in an outer periphery of said end portion of said hollow pin.

7. The method according to claim 6, wherein said metal is an aluminum alloy.

8. The method according to claim 7, wherein said surface-treated layer is an oxide corrosion-resistant film.

9. The method according to claim 6, wherein said metal is a ferrous material.

10. The method according to claim 9, wherein said surface-treated layer is one of chromium plating and nickel plating.

\* \* \* \* \*